United States Patent [19]

Raven

[11] 4,008,461

[45] Feb. 15, 1977

[54] APPARATUS FOR CORRECTING AND ADDING DATA TO THAT TAKEN FROM A MECHANICAL DATA CARRIER

[75] Inventor: Manfred V. Raven, Erlangen, Germany

[73] Assignee: Siemens Aktiengesellschaft, Munich, Germany

[22] Filed: Sept. 17, 1975

[21] Appl. No.: 614,181

[30] Foreign Application Priority Data

Sept. 25, 1974 Germany ............ 2445814

[52] U.S. Cl. .................. 340/172.5; 235/151.11
[51] Int. Cl.² ........................... G05B 19/00
[58] Field of Search ............ 340/172.5; 235/151.11

[56] References Cited

UNITED STATES PATENTS

| 3,562,715 | 2/1971 | Bishop | 340/172.5 |
| 3,854,353 | 12/1974 | Cutler | 82/1 C |
| 3,864,669 | 2/1975 | Schlickeiser et al. | 340/172.5 |

Primary Examiner—Mark E. Nusbaum
Assistant Examiner—C. T. Bartz
Attorney, Agent, or Firm—Kenyon & Kenyon Reilly Carr & Chapin

[57] ABSTRACT

In a machine tool perforated tape numerical control system, a correction storage means is provided in addition to normal storage to permit additional and corrected information to be added to and substituted for the information coming from the perforated tape.

4 Claims, 1 Drawing Figure

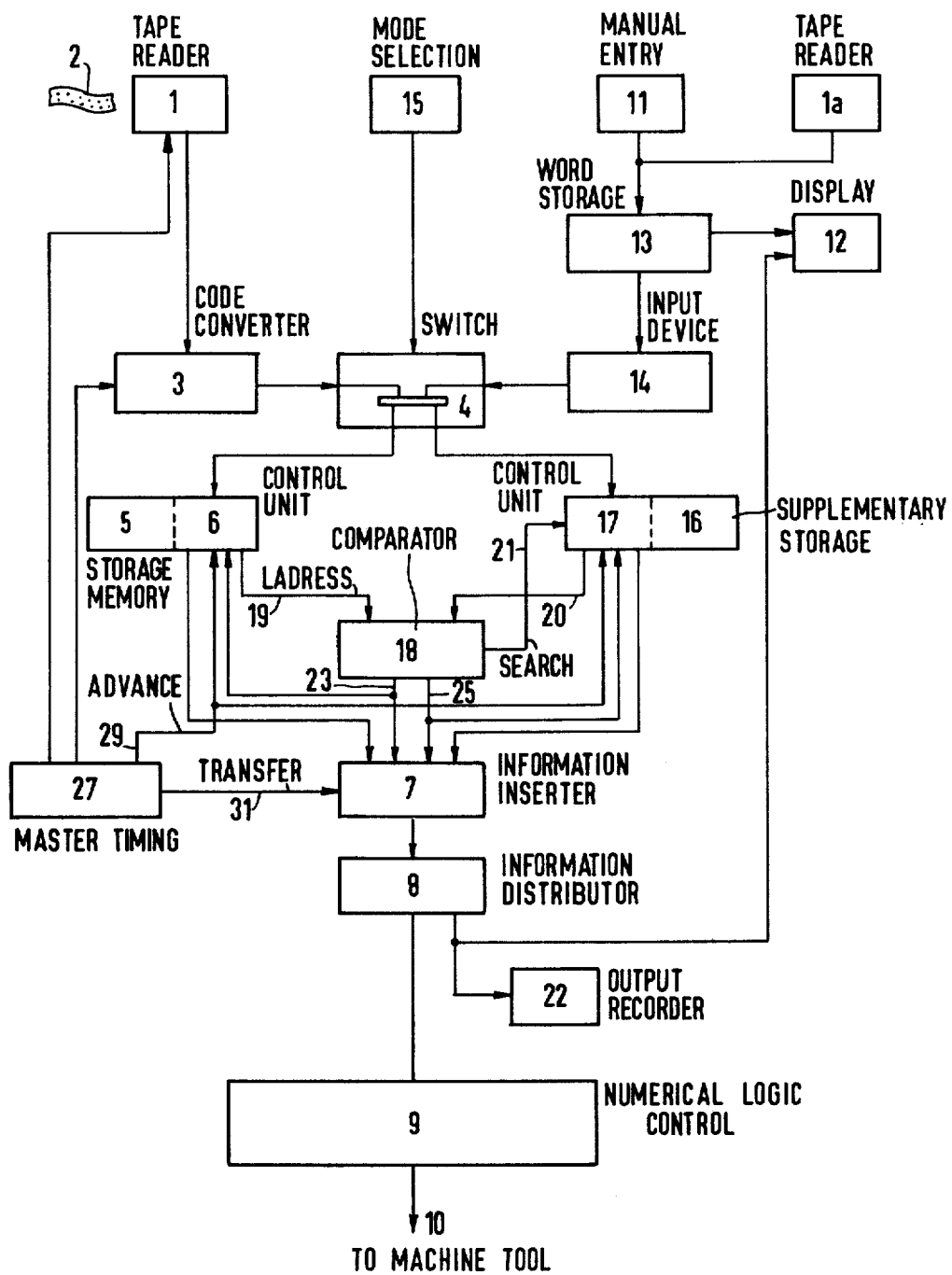

APPARATUS FOR CORRECTING AND ADDING DATA TO THAT TAKEN FROM A MECHANICAL DATA CARRIER

BACKGROUND OF THE INVENTION

This invention relates to machine tool numerical control systems in general and more particularly to improved machine tool control system of the type operated from perforated tape which permits changing and adding data.

Machine tool controls of the general type with which the present application deals are well known in the art and are disclosed, for example, in Siemens-Zeitschrift Vol. 47 (1973), Supplement entitled "Controls and Drives for Automatic Machine Tools", pages 8 to 11.

In the art of numerical control of machine tools a program is prepared by a programmer in accordance with the requirements of the work piece and the machine. This program is transferred to perforated tape or the like and using the perforated tape, a test run is made on the machine tool. Frequently it turns out that the program still contains errors, possibly because of the incorrect programming of coordinate values or because feed speeds or spindle speeds where chosen to be too high or two low. Presently, it is customary to note the necessary corrections and return them along with the perforated tape to a programming department which has available the necessary equipment for making a new tape. The new tape is then prepared taking into consideration corrections. This necessity to return the tape for correction leads to an undesireable lengthening of the overall processing time and furthermore results in idle machine time. Alternatively, it necessitates resetting the machine to a new work piece in the meantime. In view of these problems direct correction of the tape at the machine is extremely desirable.

One possible solution to this problem would be to write the entire program into an electronic memory associated with the numerical control and to correct for programs stored therein by deleting incorrect and adding missing information. However, to do so requires storage means of a size tailored to the largest possible overall program to be stored on perforated tape. As a result, a potentially very large memory is required. This adds to the overall expense and, furthermore, with this type of correction scheme, there is the danger of unintentional intervention in correct portions of the program.

A further problem arises in connection with supplementing and expanding information for the control of the machine tool if the geometrical information and technological information are separated in the preparation of the program. What is meant by geometrical information is information relating to the desired shape of work piece and is independent of the material and machine used. Technological information relates to the specific machine and material being worked, i.e. speeds, etc.

It is of great advantage that geometric information, which supplies the bulk of the data be available to always be taken from the same perforated tape and this information supplemented only in dependence on the machine used.

In view of these various deficiencies in the prior art and the desireability of having the noted capabilities, the need for a new machine control system utilizing numerical control becomes evident.

SUMMARY OF THE INVENTION

The present invention solves this problem by providing means which permits correction and/or supplementary information to be entered through a supplementary storage means. In accordance with the present invention, when a record taken from the mechanical data carrier is called up in the program buffer storage memory, the address corresponding to the address of this record is automatically called in the supplementary storage means. Any correction and/or supplementary information recorded in the supplementary storage memory is then inserted into the record taken from the data carrier as it is transferred to the numerical control.

Through this arrangement a considerable speed-up of the machine process with regard to corrections takes place. Incorrect perforated tapes need no longer be returned but instead it is possible to work with a corrected program immediately at the site of the machine tool.

With regard to programming, there is a further advantage in that the perforated tape need not be tied to a machine but can be supplemented according to the technical requirements. The supplementary information is preferably entered using a second perforated tape reader. In addition, to provide the necessary documentation for future use, the corrected program can also be transferred to a data carrier, e.g. a perforated tape or magnetic tape.

The supplementary apparatus of the present invention when used conjunction with a numerical control requires only a relatively small overall expenditure since the supplementary storage memory need be designed only to receive corrections and not the complete program. Furthermore, the solution of the present invention gives the operator greater assurance when inputting correction data since the original program read in by the perforated tape remains unchanged. Furthermore, the supplementary storage memory can be directly used, in part as a subroutine storage memory for a continuously recurring process, e.g. for thread cutting.

In this connection it should be noted that it is already known in numerical machine tool control to use a main program which calls up subroutines. The subroutine is normally recorded on a separate perforated tape and read by a separate reader. See, for example, Siemens-Zeitschrift 1980, Supplement "Numerical Control", pages 6 and 7.

BRIEF DESCRIPTION OF THE DRAWINGS

The single FIGURE is a block diagram illustrating the improved system of the present invention.

DETAILED DESCRIPTION OF THE PREFERRED EMBODIMENT

As noted above, the present invention is an addition to a conventional numerical control system. In a well known manner, a paper tape 2 is read by a tape reader 1 and fed through a code converter, e.g. a parallel to serial converter 3 through a switch 4 to a buffer storage memory 5 having a program control unit 6. From the program buffer storage memory 5, which will contain only a limited number of records, the information is transferred record by record through the information inserter 7 of the present invention and a conventional information distributor 8 to the numerical logic control 9 which then provides an output 10 to the machine tool, not shown, in well known fashion. The system operates in such a manner that once the instructions contained in an old record have been carried out, a new record is read in by the reader. In actual practice, the capacity of the program buffer store permits new records to be read in from the perforated tape while the process called for by the old record is still running. However, with appropriate scanning of the perforated tape it is possible to dispense with the program buffer storage memory 5 altogether. Furthermore, it is possible to expand the buffer storage memory 5 to extent that it can accommodate the entire perforated tape program. Also shown on the figure is a mode selection switch 15 coupled to the switch 4 which permits alternatively coupling the buffer storage memory 5 to a manual entry means 11, which can be made up of decade switches or the like, or a supplementary tape reader 1a. The ouput of the manual entry means 11 is fed through a word storage means 13 and an input device 14 to the switch and then to the buffer storage memory 5. The input device 14 can be a device similar to the code converter 3 which can convert a parallel input into serial data for transfer to the memory. It is also possible to provide an additional input device to the control system, e.g. a device for connection to a digital computer.

What has been described to this point is conventional in controls of this nature with the exception of the information inserting device 7. In accordance with the present invention, in addition to the apparatus so far described there is a supplementary storage memory 16 controlled by a control unit 17 and having its output coupled to the information inserter 7. It obtains its input from the switch 4. This permits it to be connected to any of the input devices. This supplementary storage memory 16 receives the correction and supplementary information and may also be used to store subroutines. Also shown is a comparator 18 coupled to the buffer storage memory 5 and receiving therefrom the address of the next record to be transferred to the numerical logic control. The second input to the comparator is obtained from the supplementary storage memory 16. An output to cause searching or scanning of the supplementary storage is provided from the comparator on line 21.

In operation, the correction data which has been determined during the test run is entered into the supplementary storage memory 16 using the manual input 11. Various types of well known memory systems can be used for this device. The primary requirement is that when a given record number from the program entered through the tape reader 1 is called up from the buffer storage memory 5 that the same record number, if additional or correction data is to be provided, be available at the output of the supplementary memory 16.

Operation of the device can best be understood by means of an example. Presume a program with 20 records, i.e. 20 steps. Associated with each of the steps will be an address or step number and data relating to the action to be taken. This information is programmed on the paper tape 2. The tape is read by the tape reader with the information taken off in parallel fashion. The code converter converts to serial information which is fed through the switch 4 into the buffer storage memory 5. Its control unit 6 presents the data record by record to the information inserter 7 which then, during the initial step, transfers it to the information distributor 8 from whence it goes to the logic control 9. During the first phase when the program is being evaluated, it is stepped through all 20 steps in this manner. Presume that an error is found in step 5 and that at step 10 an extra step is to be added. This information is now entered through the manual entry device 11. Since it can only be entered one bit at a time, the word storage 13 is necessary to store the information as it is being entered. Once the full record, including the address is in the word storage it is transferred by the input device through the switch 4, with the mode selection of the switch placed so as to couple to the supplementary storage memory 16, to input device 14. In the case of the error at step 5, this will simply be a corrected instruction with the address 5 associated therewith. For step 10 where an additional step is to be added, the old step will entered along with the new step which is to follow it. The address 10 will be associated with both of these steps. Now, in the supplementary storage memory is stored three instructions the first having the address 5 and second two having the address 10. The supplementary storage memory can be, for example, a circulating shift register with sufficient bit positions to store the required number of records. Once the correction information is placed in the register, a dummy record with an address higher than that of any program address can be placed in after the last correction or addition. Furthermore, it is preferable that before the first correction another dummy record with the address 0 be placed in. On startup, the control unit 17 is arranged to circulate the data in the shift register until the dummy record having the address 0 is reached. Now the tape 2 containing the errors is again read in through the tape reader in the manner described above. Each time a new record is presented to the information inserter 7 its address is provided to the comparator 18. In the comparator 18 this address on line 19 is compared with the address on line 20 from the supplementary storage memory. The comparator 18 is the type providing three outputs. One of these outputs is an output indicating that the input on line 20 is less than that on line 19, a second output is provided when the two are equal and a third output if the input on line 20 is greater than the input on line 19. As noted, the supplementary memory is now at record 0 and will be outputting 0 on line 20. As the control unit 6 outputs the first record, numbered 1, to the information inserter the number on line 19 will be greater than the number on line 20. This output from the comparator is provided on line 21 and tells the control unit to search or in other words, to advance one record. The control 17 advances one record in the supplementary storage memory. Now the output on line 20 is 5. This is a number greater than the address 1 on line 19. Thus, the comparator puts out the greater than output. This is provided on line 23 and indicates that the normal input is to be used. This is provided to the information inserter 7. Information inserter 7 can comprise two sets of AND gates. The first set will have a data input from the buffer storage memory 5 and an enabling input from line 23. The second group of AND gates will have data inputs from the supplementary storage member 16 and enabling inputs from the line 25. The outputs of the two sets of AND gates are coupled through OR gates to provide the final output to the information distributor. As soon as the supplementary storage memory 16 is advanced and the greater than output appears on line 23, the first set of gates will be enabled and the normal input from the buffer storage memory 5 will be provided to the information distributor 8 for execution in the numerical logic control. This continues until the address 5 is reached. Now the comparator output changes to the equal to output. This output is provided on line 25 and the first set of gates are disabled and the second set of gates enabled. Now, instead of using the old instruction, the new instructions stored in the supplementary storage memory is used and provided rovided to the information distributor. After execution, the supplementary memory will be advanced one record, in a manner to be described below, by the control unit 17. Its address is 10, greater than 6 on the line 19 and thus the normal information from the buffer storage 5 will be provided as the output from information inserter 7. This will continue until record 10 is reached and a comparison found. Once again, the correction information will be inserted instead of the old information.

The output on line 23 from comparator 18 is also fed back as an enabling input to the control unit 6. Only if it indicates a normal output is control unit 6 allowed to advance. The control unit 17 automatically advances the supplementary memory 16 after each corrected record is read out. Thus, at the address 10 it will advance and the address 10 will appear again. This insertion will now be fed through the information inserter and the information distributor to the numerical logic control without the control unit 6 advancing to the next address 11. This will continue until all the new steps having the number 10 are fed through to the logic control. At that point, the control unit 17 will have advanced the supplementary storage memory to the dummy number having a number higher than any program number. This will cause the output of the comparator on line 23 to appear enabling the control unit 6 to advance the buffer storage memory to the next record address 11. The rest of the program will then be run through in normal fashion.

Also shown on the figure are master timing means 27 which synchronize the operation of all of the various parts of the system in conventional fashion. Of particular interest are the outputs on lines 29 and 31 labeled "Advance" and "Transfer". An input from the numerical logic control 9 informs the master timing 27 that the previously requested operation has been completed. Thereupon an advance command is output to the control unit 6. If the previous step was a normal step as indicated by the output on line 25, the control unit 6 advances the storage buffer memory to the next record. If the last input was a correction, then this output, provided to the control unit 17, causes the control unit 17 to advance. For this purpose an output from the line 25 back to the control unit 17 to enable advancement is provided. Consider the two possibilities described above. In the first case, a correction was provided at address 5. The address 5 had been provided both on line 19 and line 20 and there was a correction output on line 25. This enabled the control unit 17 to advance in response to the advance input from the master timing 27. Thus, it advanced to the adress 10. The comparator output now changes to normal enabling the control unit 6 to advance to the record 6 which is now present at the information inserter 7 with the gates to which it is supplied enabled by the output on line 23. After sufficient time for both control units to advance their respective memories if enabled, a delayed transfer output on line 31 is provided which is a gating input for all gates in the information inserter. Now, the enabled gates coupling the output of the storage buffer memory 5 provide their information to the information distributor.

In the case of the additions at step 10, after the supplementary storage memory is advanced it is still at address 10 and the control unit 6 does not become enabled. Therefore when the transfer command results on line 31 the AND gates associated with the supplementary memory 16 are enabled and that information is gated out to the information distributor. All of the information which comes from the information distributor is provided to an output recorder which may be a paper tape punch. The output recorder 22 generates its own addresses in sequence. Thus, it prepares a corrected tape which can be used the next time through. For example, for the first four records, it would record the old information which was provided through the system. For the fifth record it would record the address 5 and the new information. When it reached the 10th record, where additional data was provided, for example three records all numbered 10, it would renumber these as 10, 11 and 12. Then what was previously numbered record 11 would be numbered record 13 and so on. In this manner, the system of the present invention permits correcting data at the machine and at the same time generating an output record of the recorded data. It will be recognized, that the output recorder rather then being a paper tape punch, may also be a magnetic recorder or the like.

The manner in which the present invention permits carrying out subrountines will be evident to those skilled in the art. For example, the additional instructions at step 10, rather than being additions could be a subroutine. In the manner described, the apparatus will carry out those steps in the subroutine until the subroutine is finished and a higher number appears at which time it will return to the main program in the storage buffer memory 5.

Furthermore, through the mode selection 16 and switch 4, it becomes evident that is possible to load information from the tape reader 1 into the supplementary storage memory 16. Thus, in a program with subroutines, the mode selection can be appropriately actuated and the subroutines then read into the supplementary storage after which the switch is changed and the tape reader then used to read the main program in through the buffer storage register. Alternatively, if included, reader 1a may be used to load the subroutines.

Thus, an improved system for use in numerical logic control of machine tools have been shown. Although a specific embodiment has been illustrated and described, it will be obvious to those skilled in the art that various modifications may be made without departing from the spirit of the invention which is intended to be limited solely by the appended claims.

I claim:

1. In a numerical machine tool control system comprising:

a. a program buffer storage memory;

b. means coupled to the input of said program buffer storage memory for reading control information in the form of records of data each containing an address and an instruction from a mechanical data carrier such as a perforated tape into said buffer storage memory;

c. a numerical logic control having its output coupled to control the machine tool; and d. means for sequentially calling up the information in said buffer storage memory record by record in the order of addresses associated therewith and providing said records to said numerical logic control, the improvement comprising apparatus for correcting and supplementing information contained on the mechanical data carrier comprising:

e. a supplementary storage memory;

f. means coupled to the input of said supplementary storage memory to enter information in the form of additional records, having addresses the same as at least some of the records entered into said buffer storage memory, into said supplementary storage memory;

g. means for inserting information interposed between said numerical logic control and said buffer storage memory, said means also having an input from said supplementary memory, for selectively providing to said numerical logic control one of its inputs; and h. means coupled to control said means for inserting information including means to compare the address of the information being called up from said buffer storage memory for output to said numerical logic control with the addresses stored in said supplementary storage memory and upon finding the same address in said supplementary storage memory to enable said means for inserting information to provide the information stored in said supplementary storage memory to said numerical logic control and otherwise to provide the output of said buffer storage memory to said numerical logic control.

2. Apparatus according to claim 1 wherein said means to enter information into said supplementary storage memory comprises a separate perforated tape reader.

3. Apparatus according to claim 1 and further including means coupled to the output of said means for inserting information for recording the data which is supplied therefrom to said numerical control.

4. Apparatus according to claim 1 wherein said means to compare include means to advance the data in said supplementary storage memory each time said information insertion means couples information from said supplementary storage means to said numerical logic control and means to prevent said buffer storage memory from being advanced as long as there is an address present at the output of said supplementary storage memory the same as the address in said buffer storage memory whereby a subroutine in the form of a plurality of records, all having the same address, may be stored in said supplementary storage means, all of which will be provided to said numerical logic control prior to said buffer storage memory being advanced to its next record.

* * * * *